Nov. 28, 1961  C. O. SLEMMONS ET AL  3,010,715
CIRCULAR AIR SPRING

Filed Dec. 12, 1957  3 Sheets-Sheet 1

INVENTORS
Charles O. Slemmons
Bruce O. Bordenkircher
BY McCoy, Greene + Te Grotenhuis
ATTORNEYS INVENTORS
Charles O. Slemmons
Bruce O. Bordenkircher
ATTORNEYS INVENTORS
Charles O. Slemmons
Bruce O. Bordenkircher
BY
ATTORNEYS United States Patent Office 3,010,715
Patented Nov. 28, 1961

3,010,715
CIRCULAR AIR SPRING
Charles O. Slemmons, Akron, and Bruce O. Bordenkircher, Cuyahoga Falls, Ohio, assignors to The General Tire & Rubber Company, Akron, Ohio, a corporation of Ohio
Filed Dec. 12, 1957, Ser. No. 702,366
2 Claims. (Cl. 267—65)

The present invention relates to an improved form of air spring for use in vehicle suspension systems.

More particularly, the present invention relates to a single diaphragm, circular air spring which is adapted to work at relatively high operating pressures, which does not require an auxiliary pressure chamber, and which is compact and occupies a small space.

Any air spring in which a permanent fold or buckle forms in the diaphragm wall is impractical because the diaphragm sooner or later cracks and fails along the line of the fold. One of the principal reasons why earlier forms of air springs shown in the prior art never found their way into commercial use is the fact that they developed a fold or buckle in the diaphragm at one point in their cycle. Some air springs were even designed with such a fold.

In order to eliminate a fold in the diaphragm, various forms of air springs with relatively large loop portions in the diaphragm have been developed but they have the attendant disadvantage of occupying quite a bit of space, requiring large clearances, and otherwise being impractical.

The object of the present invention is to provide an air spring which overcomes the above and other problems so as to be readily incorporated in automobile and other vehicle suspension systems, not occupy excessive space, and have a long and useful life with minimum of maintenance.

Other objects and advantages will be apparent from the following description of the invention in which like numerals relate to like parts throughout the several views.

Referring to the drawings.

Figures 1, 2, 3:
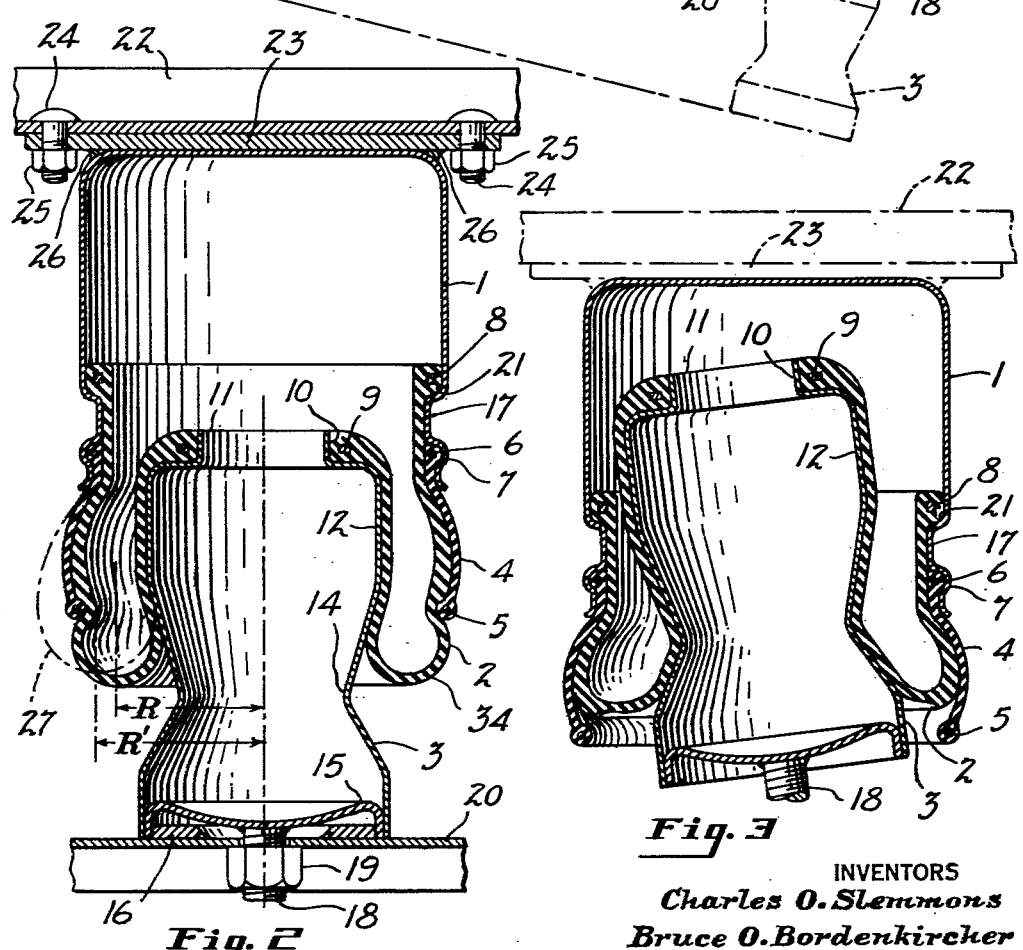
FIGURE 1 is a side elevation of an air spring of the present invention mounted between the vehicle frame and undercarriage.
FIG. 2 is an enlarged view in cross-section of the air spring of FIG. 1 in its normal or median position.
FIG. 3 is a cross-section of the air spring of FIG. 1 as the spring approaches full jounce.

In accordance with the present invention, I have developed an air spring comprising a cylindrical, open-ended can 1, a piston 3 having relieved sidewall portions which is received in the open end of the can, and a diaphragm 2 joining the edges of the can and edges of the piston face to form an enclosed, airtight pressure chamber. The upper portion of the diaphragm is provided with a pliable, inextensible band 4 with lower ring 5 which helps to define the diaphragm shape.

The cylindrical can 1 is open at one end and is mounted on the vehicle frame 22 with its open end facing out from the frame. Mounted on the undercarriage and received into the open end of the can is a piston 3 with inwardly tapering sidewalls 12. A pliable diaphragm of rubberlike material 2 extends from the edge of the face 11 of the piston to the open edge portion 17 of the can, forming a loop 34 in the diaphragm adjacent the piston sidewall and defining an airtight pressure chamber.

Diaphragm bead 8 on the outer edge of the diaphragm fits in pocket 21 formed in the open edge portion of the can and piston bead 9 on the inner edge of the diaphragm fits in pocket 10 formed in the edge portion of the piston face 11. The inner walls of the diaphragm, piston face, and inner walls of the can together define the primary pressure chamber.

A ring 5 is positioned outside the diaphragm below the piston face in the median position and adjacent the edge of the loop or roll of the diaphragm so as to restrain the same and increase its burst strength and the operating pressure. A flexible and inextensible band 4 mounted concentrically outside of the diaphragm between ring 5 and the open edge of the can helps to hold the ring 5 in position as shown and restrain the upper portion of the diaphragm. Bead 6 at the edge of the band opposite from ring 5 fits in socket 7 in the edge portion of the can below diaphragm bead 8.

Referring to FIG. 2, the can is welded to plate 23 at weld 26 and then plate 23 is bolted to the vehicle frame by bolts 24 and nuts 25. The piston is formed with a concave base 15 to which is welded a stud 18. Reinforcing ring 16 is also welded to base 15. Stud 18 is bolted to undercarriage 20 with bolt 19 as shown. Should it be found desirable, the can and piston arrangement may be reversed. The can may be mounted on the undercarriage and the piston mounted on the frame.

The piston profile or sidewall is relieved or cut away slightly below the middle portion 14 so as to provide the necessary amount of clearance for the diaphragm loop between ring 5 and the piston sidewall 12 as the piston works up and down therein. When the piston is in the median position as shown in FIG. 2, the relieved portion of the sidewalls should be immediately below the bottom of the diaphragm loop. With this arrangement, as the piston moves on into the can and approaches full jounce, the loop is not collapsed or buckled and the diaphragm is not folded. Furthermore, as the piston approaches full jounce the effective area is increased and the spring action stiffened because the bottom of the loop is pushed laterally outward.

By having the arrangement shown, it is possible to have relatively small clearance between the piston sidewall 12 and depending edge portion 17 of the can and at the same time maintain a loop or roll in the diaphragm.

Figures 4, 5:
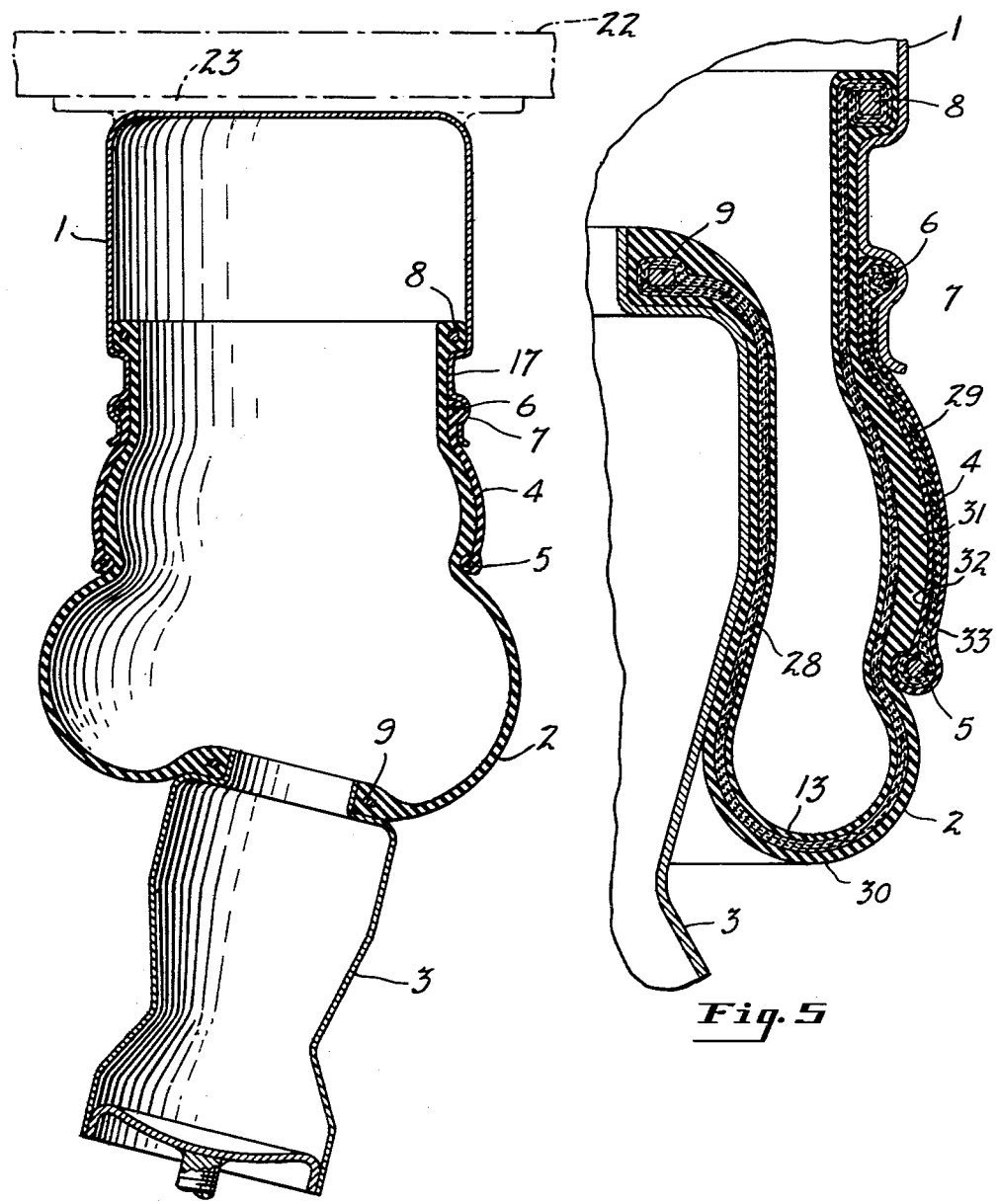
FIG. 4 is a cross-section of the air spring of FIG. 1 as the air spring approaches full rebound.
FIG. 5 is an enlarged cross-section showing the details of construction of the diaphragm and flexible reinforcement.

Details of the diaphragm construction are shown in FIG. 5. The diaphragm is preferably made of tire carcass rubber with cord reinforcement with an airtight inner layer, if necessary. It can be made of polyurethane rubbers and other airtight, pliable, and weather-resistant materials as is well-known in the art.

Fundamentally, this construction is similar to tire carcass construction and comprises beads 8 and 9 reinforcing fabric 28 and surrounding rubber layers 13 and 30. The rubber layer 30 is provided with a thickened portion 31 inside the band 4 to position the band and shape the diaphragm. The band 4 comprises bottom ring 5 and top bead 6 with reinforcing fabric 29 and inner and outer rubber layers 32 and 33. It is reinforced so as to be substantially inextensible in a lateral direction, but remain pliable. The function of the band is to position ring 5, shape the upper portion of the diaphragm, and protect the diaphragm from road grit, stones, and the like. The diaphragm is molded and vulcanized to the cross-sectional shape shown in the median position of FIG. 2. The molding process is described in detail in copending application Serial No. 695,096, filed November 7, 1957 which is assigned to the same assignee as the assignee hereof. The diaphragm is substantially cylindrical with inner and outer edges on each end thereof, the outer edge incorporating the can bead and the inner edge the piston bead. In cross-section, it is similar to a pair of U-shaped members spaced on each side of the piston sidewalls with the bottom of the U corresponding to the rolling diaphragm loop, the inner top of the U fitting into the piston face edge, and the outer top of the U fitting into the can edge. The outer side of the U extends above the inner side in the median position.

The action of the air spring is illustrated in FIGS. 2, 3 and 4. FIG. 2 is the median or normal load position. FIG. 3 is nearing full jounce, and FIG. 4 is full rebound.

Figure 6:
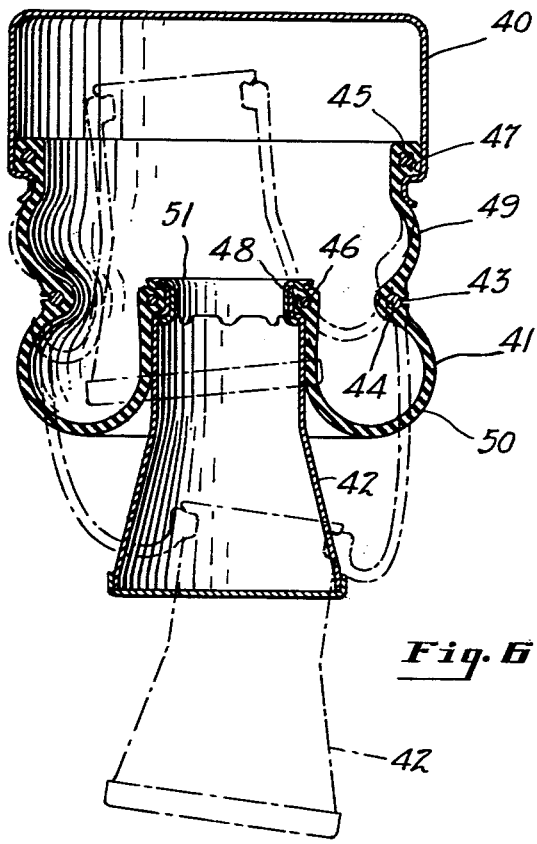
FIG. 6 is a cross-section of a modified form of air spring of the present invention in the normal or median position.

FIG. 6 shows a modified form of air spring in which the band is omitted and a ring is positioned in a pocket in the diaphragm instead of being a part of the band and positioned thereby. Referring to FIG. 6, the air spring comprises an open-ended can 40, a dual-looped diaphragm 41 with a restraining ring 43 in the middle thereof, and a piston 42. The can is mounted on the frame and the piston on the undercarriage. Diaphragm bead 45 fits in pocket 47 defined in the open edge of the can and bead 46 fits in pocket 48 formed in the edge of the piston face. A pocket 44 is molded into the middle of the diaphragm at the juncture of the two diaphragm loops 49 and 50 and a restraining ring 43 is positioned therein. Other narrow restraining means, such as a thin band, may be used in place of the ring 43 provided that such means does not interfere with the diaphragm loop formation.

The diaphragm 41 is constructed of fabric reinforced, rubberlike material similar to diaphragm 2. It is molded to the cross-sectional shape shown in solid lines in FIG. 6, which is the normal or median position.

The modification of FIG. 6 distinguishes from that of FIGS. 1–5 in that there is no band about the upper loop and no restraint thereof. In other respects it is similar and behaves similarly. The diameter of the piston face 51 is smaller than piston 3 and the piston sidewalls 52 are straight from the face and then flare outward toward the base. This provides greater clearance between the edge of the piston face and ring 43 and allows a larger and freer diaphragm loop. If desired, the sidewalls can be inwardly relieved at the middle portion similarly to piston 3. The important consideration is that minimum clearance be maintained between the piston and can and, at the same time, the diaphragm loop be maintained and not buckled.

The action of the air spring is illustrated by the solid line median position and phantom line jounce and rebound positions.

The present invention is only concerned with circular air springs, the plan view of the air springs shown and can, piston and diaphragm being circular.

The rings 5 and 43 provide a small effective area for all spring openings in relation to the diameter of the can openings. The effective area comprises the area of the face of the piston plus the plan or projected area of the surrounding concentric diaphragm portion acting with the piston. The radius of the effective area is considered to extend out to the bottom of the diaphragm loop adjacent the base of the piston as shown by radius R in FIG. 2. The radius of the effective area of an unrestrained diaphragm is represented by radius R' of FIG. 2, the dotted line 27 representing the outline of an unrestrained diaphragm. The effective area multiplied by the pressure in the pressure chamber gives the load supported by the air spring.

The rings 5 and 43 further constrain and strengthen the diaphragm so that it can work at high operating pressures and have greater burst strength. High operating pressures in the pressure chamber are advantageous for low spring rates and minimize buckling problems. As a result of the higher operating pressures, an auxiliary pressure chamber is not required and there is a reduced displacement of volume during piston stroke. At the same time a very low frequency is obtained which is also sought after and advantageous for suspensions.

High operating pressures reduce buckling in that they keep the rolling diaphragm loop round both as it nears full jounce and as it nears full rebound, in the latter case minimizing tension in the diaphragm which lowers burst strength and flex life.

Finally, the arrangement of the present invention permits greater lateral and other misalignment of the piston and can without interference and a greater stroke for the same closed height. The restraining rings 5 and 43 are free to move in a lateral direction and so is the pliable band 4.

It is to be understood that in accordance with the provisions of the patent statutes, variations and modifications of the invention herein shown and described may be made without departing from the spirit thereof.

Having thus described our invention, we claim:

1. A circular air spring for use in combination with a vehicle frame and undercarriage for the purpose of cushioning and absorbing shocks and vibrations resulting from relative motion between the frame and undercarriage which comprises a cylindrical, open-ended can adapted to be mounted on one of the undercarriage and frame, a piston having a face and a base and intermediate relieved sidewalls mounted on the other of the undercarriage and frame so that the piston face is received into the open end of the can and is approximately level with the open edge of the can in the normal load position, a circular diaphragm of rubberlike material having its outer edge sealed to the open edge portion of the can and its inner edge sealed to the piston face so as to form with the piston and can an airtight pressure chamber, and a pliable inextensible band disposed on the periphery of the diaphragm and extending from the open edge of the can to the mid-section of the diaphragm and terminating in a narrow restraining ring disposed on the periphery of the diaphragm at the mid-section thereof so as to form in the diaphragm in cross-section a first relatively flat outward loop from the open edge of the can to the restraining ring and a second outward loop from the restraining ring to the sidewalls of the piston, said ring being substantially free to move in a lateral direction.

2. In combination with a vehicle frame and undercarriage, a circular air spring comprising a cylindrical open-ended can mounted on the frame, a piston having a face and a base and intermediate relieved sidewalls mounted on the undercarriage so that the piston face is received into the open end of the can and is approximately level with the open edge of the can in the normal load position, a circular diaphragm of rubberlike material having its outer edge sealed to the open edge portion of the can and its inner edge sealed to the piston face so as to form with the piston and can an airtight pressure chamber and a pliable inextensible band disposed on the periphery of the diaphragm between the open edge of the can and the mid-section of the diaphragm and terminating with a narrow restraining ring disposed in a groove on the periphery of the diaphragm at the mid-section thereof, said ring being substantially free to move in a lateral direction.

References Cited in the file of this patent

UNITED STATES PATENTS

| Re. 20,887 | Mercier | Oct. 18, 1938 |
| 971,583 | Bell | Oct. 4, 1910 |
| 2,056,106 | Kuhn | Sept. 29, 1936 |
| 2,950,104 | Bowser | Aug. 23, 1960 |
| 2,960,333 | McGavern | Nov. 15, 1960 |

FOREIGN PATENTS

| 400,616 | Great Britain | Oct. 24, 1933 |

OTHER REFERENCES

"Riding on Air," published by the Auto Car, Nov. 29, 1952, page 868 relied on.

Germany, application Ser. No. C 12176, printed Dec. 13, 1956 (KL. 63c41).